United States Patent
Hergesheimer et al.

(10) Patent No.: US 10,219,117 B2
(45) Date of Patent: Feb. 26, 2019

(54) SYSTEMS AND METHODS FOR RADIO ACCESS INTERFACES

(71) Applicant: CalAmp Corp., Irvine, CA (US)

(72) Inventors: Peter Hergesheimer, Encinitas, CA (US); Thomas M. Nornberg, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 0 days.

(21) Appl. No.: 15/430,400

(22) Filed: Feb. 10, 2017

(65) Prior Publication Data

US 2018/0103355 A1     Apr. 12, 2018

Related U.S. Application Data

(60) Provisional application No. 62/407,256, filed on Oct. 12, 2016.

(51) Int. Cl.
*H04W 4/04*     (2009.01)
*H04M 1/02*     (2006.01)
(Continued)

(52) U.S. Cl.
CPC ......... *H04W 4/046* (2013.01); *H04M 1/0202* (2013.01); *H04W 4/80* (2018.02); *H04W 84/042* (2013.01); *H04W 84/12* (2013.01)

(58) Field of Classification Search
CPC ....... H04W 4/06; H04W 4/80; H04W 84/042; H04W 84/12; H04M 1/0202
See application file for complete search history.

(56) References Cited

U.S. PATENT DOCUMENTS

| 4,497,025 A | 1/1985 | Hannoyer |
| 4,549,277 A | 10/1985 | Brunson et al. |

(Continued)

FOREIGN PATENT DOCUMENTS

| EP | 2056298 A1 | 5/2009 |
| EP | 2083276 A1 | 7/2009 |

(Continued)

OTHER PUBLICATIONS

Extended European Search Report for European Application No. 13875407.2, Search completed Nov. 22, 2016, dated Nov. 30, 2016, 7 Pgs.

(Continued)

*Primary Examiner* — Marisol Figueroa
(74) *Attorney, Agent, or Firm* — KPPB LLP

(57) ABSTRACT

Systems and methods for radio access interfaces in accordance with embodiments of the invention are disclosed. In one embodiments, a vehicle telematics device includes a processor, a communications device, and a memory, wherein the vehicle telematics device communicates with a mobile communications device using the communications device, wherein the mobile communications device is in communication with a remote server system via a mobile network connection, and wherein the vehicle telematics device provides data to the mobile communications device, where the data is to be transmitted to the remote server system, provides command data to the mobile communications device, where the command data instructs the mobile communication device to transmit the data to the remote server system using at least one communication protocol, and causes the mobile communications device to transmit the data to the remote server system using the at least one communication protocol based on the command data.

18 Claims, 10 Drawing Sheets

(51) Int. Cl.
*H04W 4/80* (2018.01)
*H04W 84/04* (2009.01)
*H04W 84/12* (2009.01)

(56) References Cited

U.S. PATENT DOCUMENTS

| | | | |
|---|---|---|---|
| 5,058,020 A | 10/1991 | Matsuda | |
| 5,117,375 A | 5/1992 | Worcester et al. | |
| 5,251,161 A | 10/1993 | Gioutsos et al. | |
| 5,253,173 A | 10/1993 | Drobny et al. | |
| 5,337,238 A | 8/1994 | Gioutsos et al. | |
| 5,339,242 A | 8/1994 | Jensen et al. | |
| 5,519,613 A | 5/1996 | Gioutsos et al. | |
| 5,559,699 A | 9/1996 | Gioutsos et al. | |
| 5,563,791 A | 10/1996 | Gioutsos et al. | |
| 5,587,906 A | 12/1996 | Muckley et al. | |
| 5,684,701 A | 11/1997 | Breed et al. | |
| 5,754,115 A | 5/1998 | Woo | |
| 5,758,301 A | 5/1998 | Saito et al. | |
| 5,780,782 A | 7/1998 | O'Dea et al. | |
| 5,805,460 A | 9/1998 | Greene et al. | |
| 5,825,283 A | 10/1998 | Camhi | |
| 5,841,201 A | 11/1998 | Ibaraki et al. | |
| 5,862,511 A | 1/1999 | Croyle et al. | |
| 6,029,111 A | 2/2000 | Croyle | |
| 6,076,028 A | 6/2000 | Donnelly et al. | |
| 6,085,151 A | 7/2000 | Farmer et al. | |
| 6,163,690 A | 12/2000 | Lilja | |
| 6,236,921 B1 | 5/2001 | McConnell | |
| 6,269,290 B1 | 7/2001 | Tsuji et al. | |
| 6,308,134 B1 | 10/2001 | Croyle et al. | |
| 6,346,876 B1 | 2/2002 | Flick | |
| 6,356,841 B1 | 3/2002 | Hamrick et al. | |
| 6,363,308 B1 | 3/2002 | Potti et al. | |
| 6,401,027 B1 | 6/2002 | Xu et al. | |
| 6,417,802 B1 | 7/2002 | Diesel et al. | |
| 6,431,593 B1 | 8/2002 | Cooper et al. | |
| 6,438,475 B1 | 8/2002 | Gioutsos et al. | |
| 6,532,419 B1 | 3/2003 | Begin | |
| 6,540,255 B1 | 4/2003 | Garcia et al. | |
| 6,611,755 B1 | 8/2003 | Coffee et al. | |
| 6,737,989 B2 | 5/2004 | Flick | |
| 6,756,885 B1 | 6/2004 | Flick | |
| 6,812,888 B2 | 11/2004 | Drury et al. | |
| 6,832,140 B2 | 12/2004 | Fan et al. | |
| 7,015,830 B2 | 3/2006 | Flick | |
| 7,020,501 B1 | 3/2006 | Elliott et al. | |
| 7,085,637 B2 | 8/2006 | Breed et al. | |
| 7,110,880 B2 | 9/2006 | Breed et al. | |
| 7,250,850 B2 | 7/2007 | Mizutani | |
| 7,272,493 B1 | 9/2007 | Hamrick et al. | |
| 7,286,929 B2 | 10/2007 | Staton et al. | |
| 7,348,895 B2 | 3/2008 | Lagassey et al. | |
| 7,366,608 B2 | 4/2008 | Hamrick et al. | |
| 7,460,954 B2 | 12/2008 | Hamrick et al. | |
| 7,484,756 B2 | 2/2009 | Chou et al. | |
| 7,527,288 B2 | 5/2009 | Breed et al. | |
| 7,577,525 B2 | 8/2009 | Hamrick et al. | |
| 7,643,919 B2 | 1/2010 | Nicaise | |
| 7,671,727 B2 | 3/2010 | Flick | |
| 7,725,218 B2 | 5/2010 | Hamrick et al. | |
| 7,765,039 B1 | 7/2010 | Hagenbuch | |
| 7,805,231 B2 | 9/2010 | Cluff et al. | |
| 8,004,397 B2 | 8/2011 | Forrest et al. | |
| 8,010,251 B2 | 8/2011 | Hamrick et al. | |
| 8,032,278 B2 | 10/2011 | Flick | |
| 8,330,626 B1 | 12/2012 | Adelson | |
| 8,489,271 B2 | 7/2013 | Hergesheimer et al. | |
| 8,688,380 B2 | 4/2014 | Cawse et al. | |
| 8,762,009 B2 | 6/2014 | Ehrman et al. | |
| 8,812,173 B2 | 8/2014 | Chen et al. | |
| 9,002,538 B2 | 4/2015 | Hergesheimer et al. | |
| 9,171,460 B2 | 10/2015 | Chen | |
| 9,179,497 B1 | 11/2015 | Teixeira et al. | |
| 9,217,757 B2 | 12/2015 | Hergesheimer et al. | |
| 9,406,222 B2 | 8/2016 | Hergesheimer et al. | |
| 9,459,277 B2 | 10/2016 | Hergesheimer et al. | |
| 9,491,420 B2 | 11/2016 | Mimar | |
| 9,644,977 B2 | 5/2017 | Camisa | |
| 9,648,579 B2 | 5/2017 | Abhishek | |
| 2002/0065045 A1 | 5/2002 | Kim et al. | |
| 2002/0100310 A1 | 8/2002 | Begin | |
| 2002/0135167 A1 | 9/2002 | Mattes et al. | |
| 2003/0001368 A1 | 1/2003 | Breed et al. | |
| 2003/0151507 A1 | 8/2003 | Andre et al. | |
| 2003/0176959 A1 | 9/2003 | Breed et al. | |
| 2004/0036261 A1 | 2/2004 | Breed et al. | |
| 2004/0075539 A1 | 4/2004 | Savoie et al. | |
| 2004/0132500 A1 | 7/2004 | Rogalski et al. | |
| 2004/0142659 A1* | 7/2004 | Oesterling | G07C 5/008 455/11.1 |
| 2004/0155790 A1 | 8/2004 | Tsuji et al. | |
| 2004/0171378 A1 | 9/2004 | Rautila et al. | |
| 2004/0257208 A1 | 12/2004 | Huang et al. | |
| 2005/0065711 A1 | 3/2005 | Dahlgren et al. | |
| 2005/0099289 A1 | 5/2005 | Arita et al. | |
| 2005/0240343 A1* | 10/2005 | Schmidt, II | G07C 5/008 701/414 |
| 2005/0283286 A1 | 12/2005 | Kanda et al. | |
| 2006/0022469 A1 | 2/2006 | Syed et al. | |
| 2006/0041336 A1 | 2/2006 | Schubert et al. | |
| 2006/0047459 A1 | 3/2006 | Underbrink et al. | |
| 2006/0050953 A1 | 3/2006 | Farmer et al. | |
| 2006/0199537 A1 | 9/2006 | Eisenbach et al. | |
| 2007/0027612 A1 | 2/2007 | Barfoot et al. | |
| 2007/0109117 A1 | 5/2007 | Heitzmann et al. | |
| 2007/0257791 A1 | 11/2007 | Arita et al. | |
| 2007/0266078 A1 | 11/2007 | Rittle et al. | |
| 2007/0271014 A1 | 11/2007 | Breed | |
| 2007/0299587 A1 | 12/2007 | Breed et al. | |
| 2008/0111666 A1 | 5/2008 | Plante et al. | |
| 2008/0114545 A1 | 5/2008 | Takaoka et al. | |
| 2008/0150707 A1 | 6/2008 | Shamoto | |
| 2008/0195261 A1 | 8/2008 | Breed | |
| 2008/0202199 A1 | 8/2008 | Finley et al. | |
| 2008/0211666 A1 | 9/2008 | Saidi et al. | |
| 2008/0211914 A1 | 9/2008 | Herrera et al. | |
| 2008/0275601 A1 | 11/2008 | Saito et al. | |
| 2008/0281618 A1 | 11/2008 | Mermet et al. | |
| 2009/0037056 A1 | 2/2009 | Erb | |
| 2009/0077229 A1 | 3/2009 | Ebbs | |
| 2009/0217733 A1 | 9/2009 | Stachow | |
| 2009/0221320 A1 | 9/2009 | Walley et al. | |
| 2010/0039216 A1 | 2/2010 | Knight et al. | |
| 2010/0039247 A1 | 2/2010 | Ziegler et al. | |
| 2010/0039318 A1 | 2/2010 | Kmiecik et al. | |
| 2010/0097316 A1 | 4/2010 | Shaw et al. | |
| 2010/0185524 A1 | 7/2010 | Watkins | |
| 2010/0273422 A1 | 10/2010 | Garrett et al. | |
| 2010/0279647 A1 | 11/2010 | Jacobs et al. | |
| 2010/0312473 A1 | 12/2010 | Hoshizaki | |
| 2010/0318257 A1 | 12/2010 | Kalinadhabhotla | |
| 2011/0060496 A1 | 3/2011 | Nielsen et al. | |
| 2011/0106373 A1 | 5/2011 | Hergesheimer et al. | |
| 2011/0109438 A1 | 5/2011 | Dijkstra et al. | |
| 2011/0130906 A1 | 6/2011 | Mayer | |
| 2011/0153367 A1 | 6/2011 | Amigo | |
| 2011/0202225 A1 | 8/2011 | Willis et al. | |
| 2011/0202305 A1 | 8/2011 | Willis et al. | |
| 2011/0238289 A1 | 9/2011 | Lehmann et al. | |
| 2011/0264393 A1 | 10/2011 | An | |
| 2011/0320088 A1 | 12/2011 | Eom et al. | |
| 2012/0022780 A1 | 1/2012 | Kulik et al. | |
| 2012/0035881 A1 | 2/2012 | Rubin | |
| 2012/0041618 A1 | 2/2012 | Sun et al. | |
| 2012/0050095 A1 | 3/2012 | Scherzinger | |
| 2012/0116669 A1 | 5/2012 | Lee | |
| 2012/0158211 A1 | 6/2012 | Chen et al. | |
| 2012/0253585 A1 | 10/2012 | Harvie | |
| 2012/0253892 A1 | 10/2012 | Davidson | |
| 2012/0259526 A1 | 10/2012 | Inoue | |
| 2012/0303203 A1* | 11/2012 | Olsen | G08G 1/012 701/29.1 |
| 2013/0002415 A1 | 1/2013 | Walli | |

(56) References Cited

U.S. PATENT DOCUMENTS

| | | |
|---|---|---|
| 2013/0024202 A1 | 1/2013 | Harris |
| 2013/0030811 A1 | 1/2013 | Olleon et al. |
| 2013/0038439 A1 | 2/2013 | Saito et al. |
| 2013/0073142 A1 | 3/2013 | Hergesheimer et al. |
| 2013/0095841 A1 | 4/2013 | Quimby et al. |
| 2013/0148554 A1 | 6/2013 | Chen et al. |
| 2013/0182693 A1 | 7/2013 | Sperling et al. |
| 2013/0204572 A1 | 8/2013 | Sato |
| 2013/0244210 A1 | 9/2013 | Nath et al. |
| 2013/0249713 A1 | 9/2013 | Adelson |
| 2013/0275001 A1 | 10/2013 | Hergesheimer et al. |
| 2013/0288659 A1* | 10/2013 | Hrabak .................. H04W 4/001 455/419 |
| 2013/0297137 A1 | 11/2013 | Fushiki et al. |
| 2013/0302756 A1 | 11/2013 | Takeuchi |
| 2013/0338855 A1 | 12/2013 | Mason |
| 2014/0074353 A1 | 3/2014 | Lee et al. |
| 2014/0094210 A1* | 4/2014 | Gellens .................. H04W 4/12 455/517 |
| 2014/0111354 A1 | 4/2014 | Hergesheimer et al. |
| 2014/0118132 A1 | 5/2014 | Braunberger et al. |
| 2014/0142886 A1 | 5/2014 | Hergesheimer et al. |
| 2014/0149145 A1 | 5/2014 | Peng |
| 2014/0180529 A1 | 6/2014 | Simon et al. |
| 2014/0236518 A1 | 8/2014 | Hergesheimer et al. |
| 2014/0236519 A1 | 8/2014 | Hergesheimer et al. |
| 2014/0303836 A1 | 10/2014 | Phelan et al. |
| 2014/0309843 A1 | 10/2014 | Chen et al. |
| 2014/0358394 A1 | 12/2014 | Picciotti |
| 2014/0379208 A1* | 12/2014 | McQuade .......... G06Q 10/0838 701/33.2 |
| 2015/0015385 A1 | 1/2015 | Tomita et al. |
| 2015/0051796 A1 | 2/2015 | Levy |
| 2015/0339241 A1 | 11/2015 | Warner et al. |
| 2016/0146615 A1 | 5/2016 | Abhishek |
| 2016/0173281 A1* | 6/2016 | White .................. H04L 9/0844 713/171 |
| 2016/0335813 A1 | 11/2016 | Hergesheimer et al. |
| 2016/0341559 A1 | 11/2016 | Camisa |
| 2017/0023610 A1 | 1/2017 | Hergesheimer et al. |
| 2017/0236339 A1 | 8/2017 | Camisa |
| 2018/0164401 A1 | 6/2018 | Hergesheimer |

FOREIGN PATENT DOCUMENTS

| | | |
|---|---|---|
| EP | 2923277 B1 | 9/2017 |
| JP | 2007178295 A | 7/2007 |
| WO | 20000017607 | 3/2000 |
| WO | 200218873 | 3/2002 |
| WO | 2014081485 | 5/2014 |
| WO | 2014130077 A1 | 8/2014 |
| WO | 2014130078 A1 | 8/2014 |
| WO | 2014202110 A1 | 12/2014 |
| WO | 2015183677 A1 | 12/2015 |
| WO | 2016081901 | 5/2016 |
| WO | 2016191306 | 12/2016 |

OTHER PUBLICATIONS

Extended European Search Report for European Application No. 13875911.3, Search completed Nov. 22, 2016, dated Dec. 9, 2016, 6 Pgs.

International Preliminary Report on Patentability for International Application PCT/US2013/054939, dated Aug. 25, 2015, dated Sep. 3, 2015, 4 Pgs.

International Preliminary Report on Patentability for International Application PCT/US2013/054943, dated Aug. 25, 2015, dated Sep. 3, 2015, 6 Pgs.

International Search Report and Written Opinion for International Application No. PCT/US13/54939, Completed Feb. 5, 2014, dated Feb. 24, 2014, 5 pgs.

International Search Report and Written Opinion for International Application No. PCT/US13/54943, Completed Feb. 13, 2014, dated Feb. 27, 2014, 6 pgs.

International Search Report and Written Opinion for International Application No. PCT/US2015/061990, completed Jan. 12, 2016, dated Feb. 4, 2016, 6 Pgs.

International Search Report and Written Opinion for International Application No. PCT/US2016/033621, completed Jul. 28, 2016, dated Aug. 5, 2016, 11 Pgs.

"Road vehicles—Diagnostic Systems—Part 2: CARB requirements for interchange of digital information", ISO 9141-2, 1994, 18 pgs.

"Surface Vehicle Recommended Practice, E/E Diagnostic Test Modes, Dec. 1991, 32 pgs."

"Surface Vehicle Recommended Practice, Universal Interface for OBD II Scan, Jun. 30, 1993, 45 pgs.", SAE International Surface Vehicle Recommended Practice, "Universal Interface for OBD II Scan", SAE Standard J2201, Issued Jun. 30, 1993.

"Surface Vehicle Recommended Practice; OBD II Scan Tool, Mar. 1992, 14 pgs."

ETSI, "GSM Technical Specification", GSM 07.07, Version 5.0.0, Jul. 1996, 77 pgs.

Extended European Search Report for European Application No. 17160719.5, Search completed Apr. 6, 2017, dated Apr. 18, 2017, 6 Pgs.

International Preliminary Report on Patentability for International Application PCT/US2013/054956, Report dated May 26, 2015, dated Jun. 4, 2015, 9 Pgs.

International Search Report and Written Opinion for International Application No. PCT/US2013/054956, International Filing Date Aug. 14, 2013, Search Completed Feb. 11, 2014, dated Mar. 6, 2014, 9 pgs.

Memsic 2125 Dual-Axis Accelerometer (#28017) Data Sheet (Parallax Inc., v2.0 Jan. 29, 2009).

* cited by examiner

SYSTEMS AND METHODS FOR RADIO ACCESS INTERFACES

CROSS-REFERENCE TO RELATED APPLICATIONS

The instant application claims priority to U.S. Provisional Patent Application No. 62/407,256, filed Oct. 12, 2016, the disclosure of which is hereby incorporated by reference in its entirety.

FIELD OF THE INVENTION

The present invention relates to communicating data and more specifically to communicating data via wireless networks.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver that can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

SUMMARY OF THE INVENTION

Systems and methods for radio access interfaces in accordance with embodiments of the invention are disclosed. In one embodiments, a vehicle telematics device includes a processor, a communications device, and a memory connected to the processor, wherein the vehicle telematics device communicates with a mobile communications device using the communications device, wherein the mobile communications device is in communication with a remote server system via a mobile network connection, and wherein the vehicle telematics device provides data to the mobile communications device, where the data is to be transmitted to the remote server system, provides command data to the mobile communications device, where the command data instructs the mobile communication device to transmit the data to the remote server system using at least one communication protocol, and causes the mobile communications device to transmit the data to the remote server system using the at least one communication protocol based on the command data.

In an additional embodiment of the invention, the mobile communications device includes a smart phone.

In another embodiment of the invention, the smart phone includes an application executing within an operating system installed on the smart phone, the application provides access to a file system provided by the operating system, and the application provides access to cellular data services via the operating system.

In yet another additional embodiment of the invention, the mobile communications device is integrated into a vehicle.

In still another additional embodiment of the invention, the mobile communications device is accessible via a vehicle data bus installed in the vehicle, the vehicle telematics device is connected to a diagnostic port within the vehicle, where the diagnostic port provides access to the vehicle data bus, and the vehicle telematics device communicates with the mobile communications device using the vehicle data bus.

In yet still another additional embodiment of the invention, the communications device includes a Bluetooth radio.

In yet another embodiment of the invention, the communications device includes a wired connection.

In still another embodiment of the invention, the communications device includes an 802.11 wireless network device.

In yet still another embodiment of the invention, the command data further includes metadata describing when the mobile communications device is to transmit the data to the remote server system.

In yet another additional embodiment of the invention, the mobile communications device determines a time to transmit the data to the remote server system independent of the command data.

Still another embodiment of the invention includes a method for transmitting data using a radio access interface, including providing data to a mobile communications device using a vehicle telematics device, wherein the vehicle telematics device includes a processor, a communications device, and a memory connected to the processor, the vehicle telematics device communicates with the mobile communications device using the communications device, the data is to be transmitted to a remote server system, and the mobile communications device is in communication with a remote server system via a mobile network connection, providing command data to the mobile communications device using the vehicle telematics device, where the command data instructs the mobile communication device to transmit the data to the remote server system using at least one communication protocol, and transmitting the data to the remote server system using the mobile communications device using the at least one communication protocol based on the command data.

In yet another additional embodiment of the invention, the mobile communications device includes a smart phone.

In still another additional embodiment of the invention, the smart phone includes an application executing within an operating system installed on the smart phone, the application provides access to a file system provided by the operating system, and the application provides access to cellular data services via the operating system.

In yet still another additional embodiment of the invention, the mobile communications device is integrated into a vehicle.

In yet another embodiment of the invention, the mobile communications device is accessible via a vehicle data bus installed in the vehicle, the vehicle telematics device is connected to a diagnostic port within the vehicle, where the diagnostic port provides access to the vehicle data bus, and the vehicle telematics device communicates with the mobile communications device using the vehicle data bus.

In still another embodiment of the invention, the communications device includes a Bluetooth radio.

In yet still another embodiment of the invention, the communications device includes a wired connection.

In yet another additional embodiment of the invention, the communications device includes an 802.11 wireless network device.

In still another additional embodiment of the invention, the command data further includes metadata describing when the mobile communications device is to transmit the data to the remote server system.

In yet still another additional embodiment of the invention, the mobile communications device determines a time to transmit the data to the remote server system independent of the command data.

DETAILED DESCRIPTION

Figure 1:
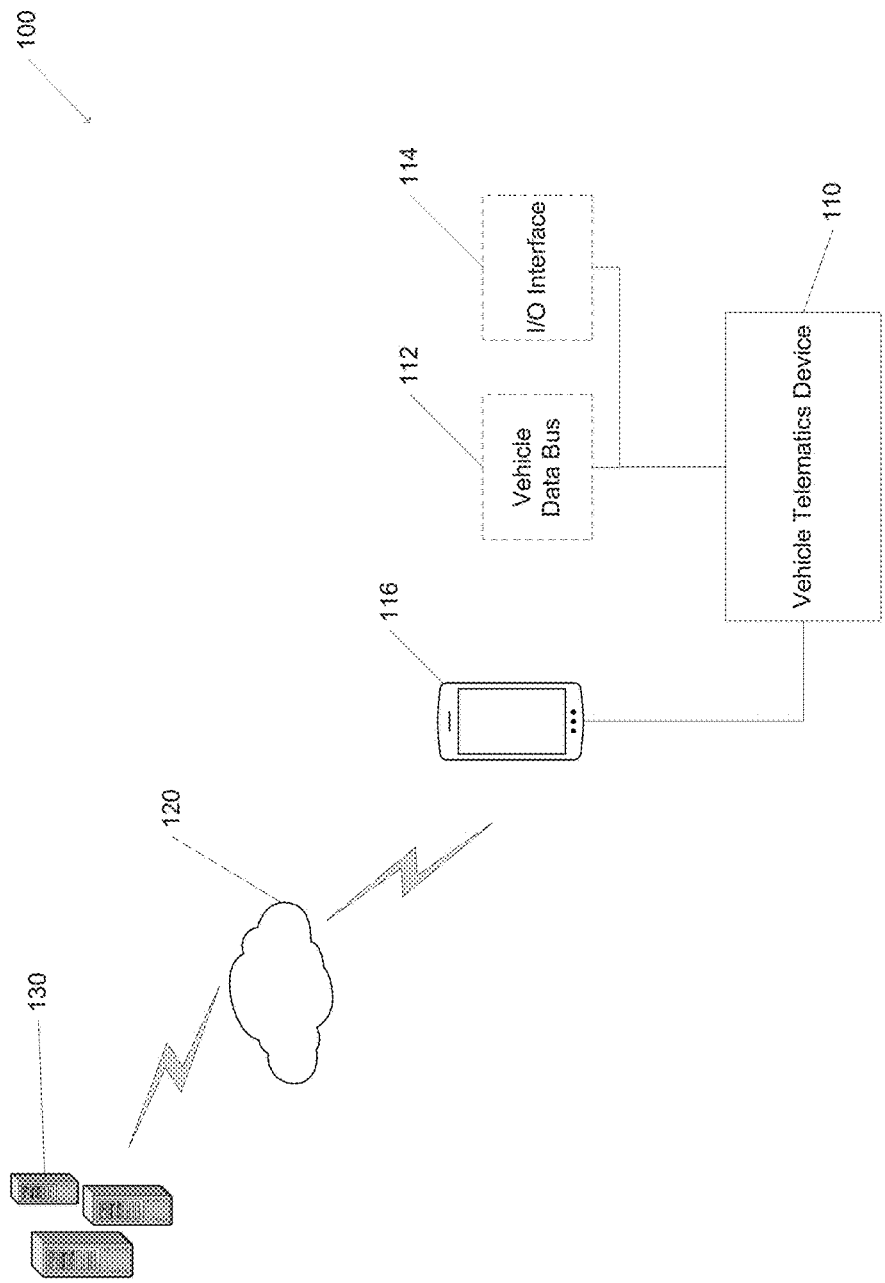
FIG. 1 is a conceptual illustration of a vehicle telematics system in accordance with an embodiment of the invention.

Turning now to the drawings, systems and methods for radio access interfaces in accordance with embodiments of the invention are disclosed. Many vehicle are equipped with a telematics unit. These telematics units can obtain and/or measure a variety of data regarding the conditions and/or location of the vehicle along with receiving and transmitting data to remote server systems. In order to facilitate these communications, the telematics units can include a radio transceiver, such as a cellular modem, which can be utilized to communicate with the remote server systems. However, these radio transceivers require a data plan or other cellular service specifically dedicated to the telematics unit. Additionally, many telematics units are only compatible with one service provider (e.g. cellular service provider), thereby requiring different versions of the telematics unit for different geographic regions and limiting the ability of a particular telematics unit to be utilized in all locations in which a particular vehicle may travel.

A variety of devices can utilize tethering techniques to share a data connection, allowing the sharing of a network connection with other devices. A variety of mobile communication devices are capable of providing tethering services to other devices by providing a network address translation (NAT) service on the mobile communication device's network connection. In many embodiments, NAT is a technique for mapping the Internet Protocol (IP) address space into another by modifying network address information in the IP packet headers while they are in transit across a traffic routing device, such as the mobile communications device providing the tethering service. In this way, tethering services provide a single device addressable on a network. However, in the event that a network connection is not available, even temporarily, tethering techniques cannot be utilized effectively. Additionally, movement of devices through a number of geographic regions can affect the ability of NAT services to properly identify and provide data to tethered devices.

Vehicle telematics devices in accordance with embodiments of the invention can utilize a variety of radio access interfaces to address these limitations of telematics units. Radio access interfaces allow a vehicle telematics device to gain access to the services (such as IP and SMS services) of a mobile communications device that is in communication with the vehicle telematics device. In this way, the service plan already in place for the mobile communications device can be utilized by the vehicle telematics device to communicate with remote server systems. In several embodiments, the radio access interface is intended for use over a Bluetooth connection between the vehicle telematics device and the mobile communications device. However, any wired or wireless connection, such as 802.11 wireless network connections and serial connections, can be utilized in accordance with embodiments of the invention. In a number of embodiments, the mobile communications device is a smart phone is running a specialized application that, through the operating system of the smart phone, has access to the phone's file system as well as access to the IP/User Datagram Protocol (UDP), IP/Transmission Control Protocol (TCP), and Short Messaging Service (SMS) data services over the cellular network. However, it should be noted that any mobile communications device, including communications devices installed in a vehicle, potentially accessible from within the vehicle via a vehicle data bus, can be utilized to provide communication services via radio access interfaces for vehicle telematics devices as appropriate to the requirements of specific applications of embodiments of the invention.

In order to facilitate the communication of data using the radio access interfaces, command data can be utilized to direct how and/or when the mobile communications device transmits data to/from the vehicle telematics device and remote server systems. In this way, the radio access interfaces improve the functioning of the vehicle telematics devices and the mobile communication devices by allowing the vehicle telematics device to communicate data even when a network connection is unavailable and to optimize the transmission of data across the network. For example, a vehicle telematics device can provide data to the mobile communications device along with the command to send the data. When the mobile communications device is connected to a network, it can transmit the data immediately, but when the network is not available it can wait to transmit the data until a network connection is established. Similarly, the mobile communications device can wait (either self-determined or as instructed in the command data) to transmit the data, such as on off-peak hours when network traffic is lower than normal. In this way, radio access interfaces improve on existing tethering techniques by allowing data to be communicated from both the vehicle telematics devices and the mobile communications devices without reliance on NAT. In a variety of embodiments, vehicle telematics devices have a relatively small amount of internal storage, while mobile communications devices often have orders of magnitude more storage capabilities. When a vehicle telematics device is unable to transmit data, situations can arise where the vehicle telematics device fills its internal storage and has either to discard previously stored data or cease creating new data until it is able to transmit the previously stored data. However, radio access interfaces allow the vehicle telematics devices to overcome this limitation by allowing the vehicle telematics device to provide the recorded data and the appropriate command data to the mobile communications device. In this way, the vehicle telematics device can operate normally even when a network connection is unavailable. It should be noted that similar processes and improvements can be observed when providing data to a vehicle telematics device via a mobile communications device via radio access interfaces as appropriate to the requirements of specific applications of embodiments of the invention.

In a variety of embodiments, the operational state of a vehicle is utilized to determine if a vehicle telematics device should transmit and/or receive data. In a number of embodiments, vehicle ignition state (i.e. the operational status of the vehicle) is ascertained by monitoring the vehicle for signs indicative of the vehicle ignition state without directly connecting to the vehicle ignition line. Information indicative of vehicle ignition state (i.e. vehicle status data) can be ascertained by observing characteristics of the vehicle including but not limited to the power supplied by the vehicle, vehicle vibration, communications on an OBD II or other vehicle data bus line, and/or vehicle position information. In many embodiments, multiple different types of information are combined to ascertain the vehicle ignition state. Systems and methods for using an asset tracking device added to the vehicle after the manufacture of the vehicle without a direct connection to the vehicle ignition line that can be utilized to determine ignition state information in accordance with embodiments of the invention are described in U.S. Pat. No. 8,489,271, titled "Systems and Methods for Virtual Ignition Detection" and issued Jul. 16, 2013, the disclosure of which is hereby incorporated by reference in its entirety.

Systems and methods for radio access interfaces in accordance with embodiments of the invention are described in more detail herein.

Vehicle Telematics Systems

Vehicle telematics systems in accordance with embodiments of the invention can transmit a variety of data between a remote server system and a vehicle telematics device using a mobile communications device. A conceptual diagram of a vehicle telematics system in accordance with an embodiment of the invention is shown in FIG. 1. The vehicle telematics system 100 includes a vehicle telematics device 110 that can communicate with a mobile communications device 116, a vehicle data bus 112, and/or an input/output (I/O) interface 114 as appropriate to the requirements of specific applications of embodiments of the invention. In a variety of embodiments, the mobile communications device 116 and/or the vehicle telematics device 110 communicates with the remote server system 130 via a network 120. In a variety of embodiments, the network 120 is the Internet. In many embodiments, the network 120 is any wired or wireless network, such as a cellular network, between the vehicle telematics device 110 and/or the mobile communications device and the remote server system 130. In a number of embodiments, the remote server system 130 implemented using a single server system. In several embodiments, the remote server system 130 is implemented using multiple server systems.

In a variety of embodiments, the vehicle telematics device 110 is installed in a vehicle having a vehicle data bus 112. In several embodiments, the vehicle telematics device 110 is connected to a vehicle diagnostic connector that provides access to the vehicle data bus 112. The vehicle telematics device 110 can obtain data from any of a variety of vehicle devices connected to the vehicle data bus 112 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device is connected directly, either wired or wirelessly, to one or more sensors within the vehicle and/or does not utilize the vehicle data bus 112.

The vehicle telematics device 110 can include any of a variety of sensors and/or devices, including those described herein with respect to the vehicle data bus and any described in more detail herein, to obtain data regarding the status of the vehicle. The vehicle telematics device 110 can also communicate with any of a variety of sensors and/or devices using the I/O interface 114. The I/O interface 114 can be any connection, including wired and wireless connections, as appropriate to the requirements of specific applications of embodiments of the invention. In several embodiments, the vehicle telematics device 110 is capable of executing scripts to read data and/or perform particular processes. These scripts can be pre-loaded on the device and/or obtained from the remote server system 130, vehicle data bus 112, and/or the I/O interface 114 as appropriate to the requirements of specific applications of embodiments of the invention. The vehicle telematics device 110 can be self-powered and/or connected into the electrical system of the vehicle in which the vehicle telematics device 110 is installed. In a variety of embodiments, the vehicle telematics device is powered via the vehicle data bus 112 and/or the I/O interface 114. In many embodiments, the vehicle telematics device 110 utilizes a Global Positioning System (GPS) receiver in order to determine the location, speed, and/or acceleration of the vehicle. In several embodiments, the vehicle telematics device 110 obtains location data from the mobile communications device 116. However, it should be noted that any location-determining techniques, such as cellular tower triangulation, wireless network geolocation techniques, and dead reckoning techniques, could be utilized as appropriate to the requirements of specific applications of embodiments of the invention.

In a variety of embodiments, the vehicle telematics device 110, mobile communication device 116, and/or remote server system 130 provides a user interface allowing for visualizing and interacting with the data transmitted and/or received between the systems. In several embodiments, the vehicle telematics device 110, mobile communications device 116, and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle telematics system in accordance with embodiments of the invention are discussed herein and illustrated in FIG. 1, a variety of architectures, including sensors and other devices and techniques not specifically described herein, can be utilized in accordance with embodiments of the invention. Furthermore, the processes described herein can be performed using any combination the vehicle telematics device, mobile communications device, and/or the remote server systems as appropriate to the requirements of specific applications of embodiments of the invention.

Vehicle Telematics Devices

Figure 2A:
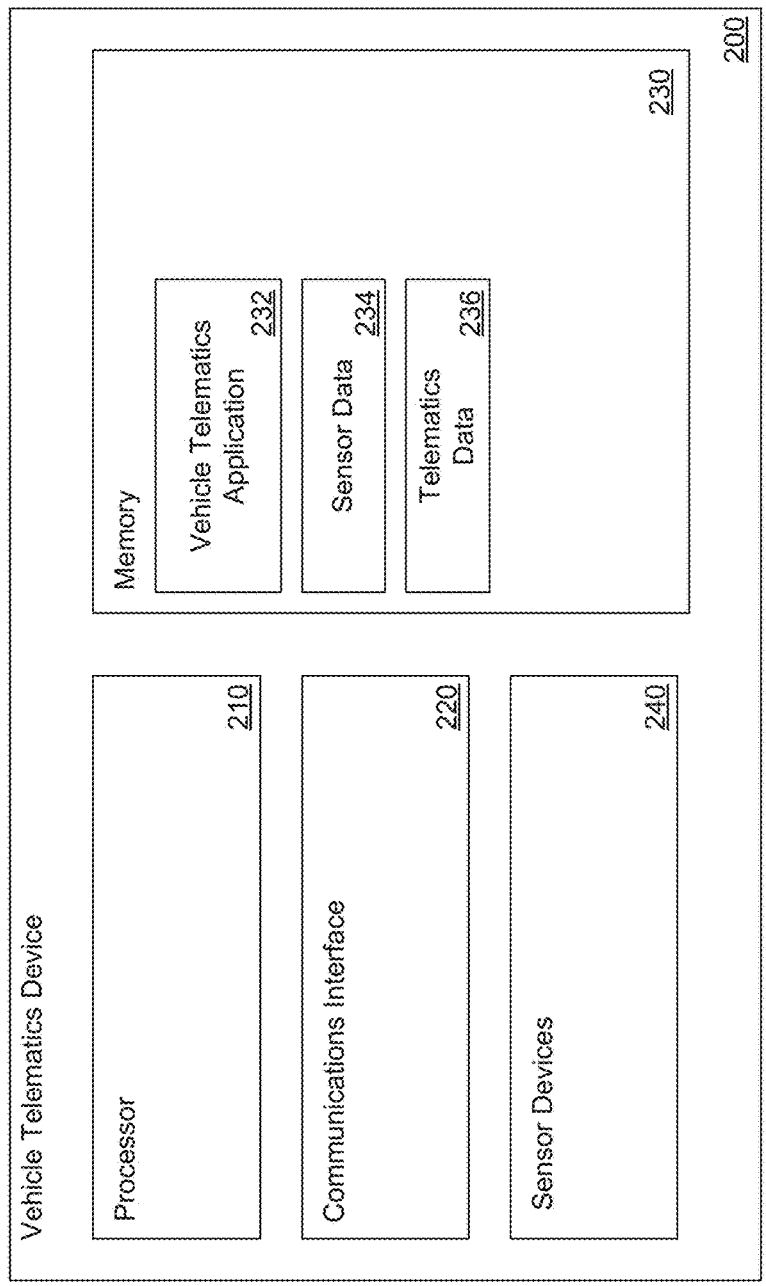
FIG. 2A is a conceptual illustration of a vehicle telematics device in accordance with an embodiment of the invention.

Vehicle telematics devices in accordance with embodiments of the invention can transmit and receive data via a mobile communications device. A conceptual illustration of a vehicle telematics device in accordance with an embodiment of the invention is shown in FIG. 2A. The vehicle telematics device 200 includes a processor 210 in communication with memory 230. The vehicle telematics device 200 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle telematics application 232, sensor data 234, and telematics data 236. In many embodiments, the vehicle telematics application 232, sensor data 234, and/or telematics data 236 are stored using an external server system and received by the vehicle telematics device 200 using the communications interface 220. Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of embodiments of the invention. Sensor devices 240 can be included within the vehicle telematics device 200 and/or located external to the vehicle telematics device 200. The vehicle telematics 200 can communicate with external sensor devices using the communications interface 220, such as via a vehicle data bus, I/O interface (including serial interfaces), mobile communications device, and/or a network connection as appropriate to the requirements of specific applications of embodiments of the invention. In a variety of embodiments, a vehicle telematics device is connected to a diagnostic connector (e.g. an OBD II port) in a vehicle.

Figure 2B:
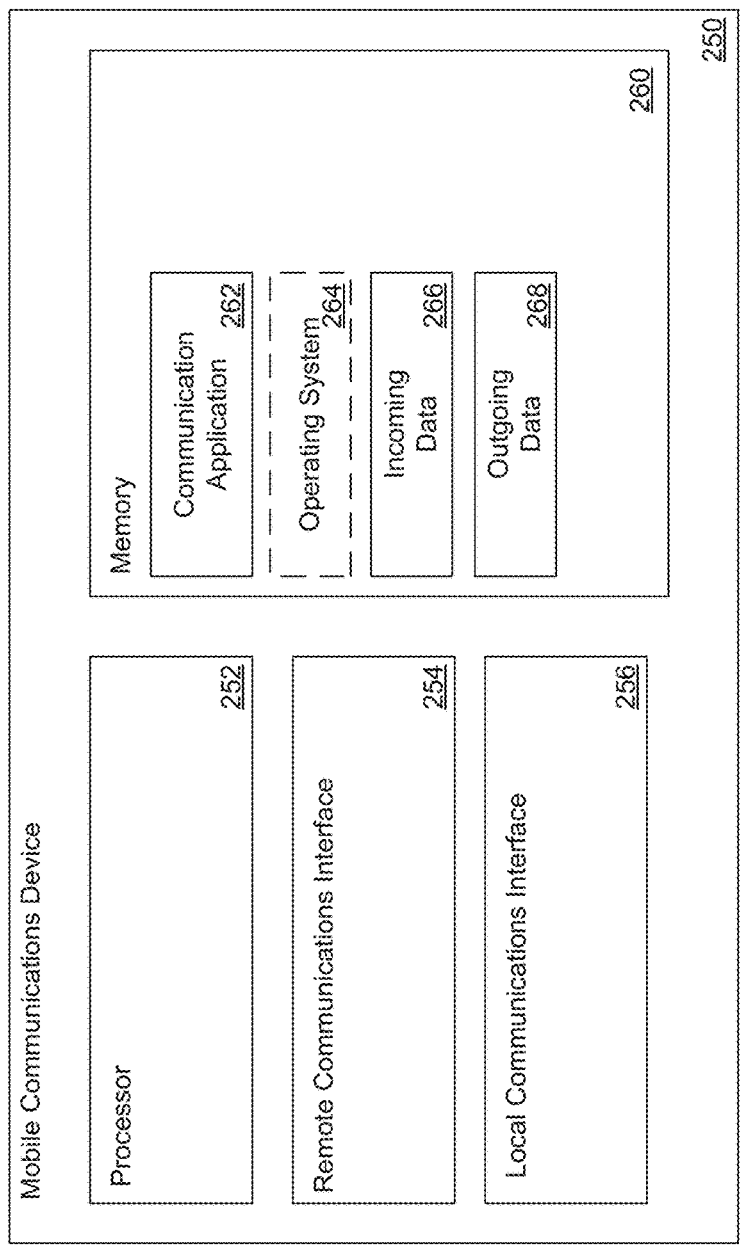
FIG. 2B is a conceptual illustration of a mobile communications device in accordance with an embodiment of the invention.

Mobile communication devices in accordance with embodiments of the invention can obtain data and dynamically configure the data for transmission to a vehicle telematics device and/or a remote server system. A conceptual illustration of a mobile communication device in accordance with an embodiment of the invention is shown in FIG. 2B. The mobile communication device 250 includes a processor 252 in communication with memory 260. The mobile communication device 250 can also include one or more remote communication interfaces 254 capable of sending and receiving data over a long distance, such as with a remote server system located outside of the vehicle in which the vehicle telematics device is installed. The mobile communication device 250 can also include one or more local communications interfaces 256 capable of sending and receiving data over a short distance, such as with a vehicle telematics device installed in the vehicle in which the mobile communications device is located. In a number of embodiments, the remote communication interface 254 and/or local communications interface 256 is in communication with the processor 252 and/or the memory 260. In several embodiments, the memory 260 is any form of storage configured to store a variety of data, including, but not limited to, a communication application 262, an operating system 264, incoming data 266, and outgoing data 268. In many embodiments, the communication application 262, an operating system 264, incoming data 266, and/or outgoing data 268 are stored using an external server system and received by the mobile communications device 250 using the remote communications interface 254.

The processor 210 and processor 252 can be directed, by the vehicle telematics application 232 and the communication application 262 respectively, to perform a variety of radio access interface processes. Radio access interface processes can include obtaining data and formatting the data for transmission between the vehicle telematics device and the remote server system. A number of radio access interface processes that can be performed in accordance with embodiments of the invention are described in more detail herein.

Although specific architectures for vehicle telematics devices and mobile communication devices in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Transmitting and Receiving Data

Radio access interface processes in accordance with embodiments of the invention include utilizing any of a variety of communication protocols to transmit data to and from a vehicle telematics device via a mobile communications device. These protocols include UDP, TCP, file transfer protocols, SMS, serial data streams, and any other communications protocol as appropriate to the requirements of specific applications of embodiments of the invention. Vehicle telematics devices and/or mobile communications devices can control the data and/or transmission protocols utilized in the radio access interface processes utilizing a variety of command data. Examples of command data that can be utilized in accordance with embodiments of the invention is described in more detail with respect to FIGS. 5A-E. In a variety of embodiments, data provided to a mobile communications device to be transmitted to a third-party server system is known as outgoing data, while data provided to a mobile communications device to be transmitted to a vehicle telematics device is known as incoming data.

Radio access interfaces can be provided for UDP communications. In many embodiments, UDP communications are utilized for domain services and for communicating with remote server systems utilizing one or more listening socket interfaces. The mobile communications device can set up a UDP listening socket on the phone, either automatically or upon request from the vehicle telematics device, for single-direction or bi-directional data exchanges between the vehicle telematics device and the one or more listening socket interfaces. Data received by the mobile communications device via the listening socket interface can be passed to the vehicle telematics device. In a variety of embodiments, this data includes the IP address and port of the originating source (i.e. remote server IP address and port). In several embodiments, the UDP datagrams generated by the vehicle telematics device and transmitted to the mobile communications device include the IP address and port of the destination for the data (i.e. remote server IP address and port). Data can be transferred via UDP datagrams from the vehicle telematics device via the mobile communications device by providing a UDP Data Notify message followed by zero or more UDP Data Messages. In a number of embodiments, these messages will not be retransmitted and, if any of messages are not acknowledged within a timeout period (which can be fixed and/or determined dynamically), the transmission of the UDP data messages can be aborted. In many embodiments, the UDP listening sockets will remain active in the event that a particular transmission fails.

Radio access interfaces can also be provided for TCP communications. In a number of embodiments, one or more TCP sockets are employed for communication with external server systems and/or for accessing GPS assist data. In a number of embodiments, GPS assist data can be utilized to provide Assisted GPS (AGPS) services, such as improving the time to fix GPS satellites. The mobile communications device can initialize and tear down TCP socket connections, automatically and/or on request from the vehicle telematics device. In many embodiments, the vehicle telematics device provides the IP address and port for the remote destination of the TCP connection, while the mobile communications device provides the status of the TCP connection and bi-directional data exchanges between the vehicle telematics device and the TCP socket interface(s). In a variety of embodiments, a vehicle telematics device initializes communications via the TCP connection by providing a TCP Data Notify Message to the mobile communications device. In a number of embodiments, a TCP Data Notify Message can be used to transfer up to 253 TCP data bytes. Data transmitted via the TCP connection can be retransmitted if not acknowledged within a timeout period, which can be pre-determined and/or determined dynamically. In many embodiments, the timeout period has a minimum value of 10 seconds and/or a retry timeout back-off sequence of 10, 20, 40, and 80 seconds. In a number of embodiments, the mobile communications device can terminate the TCP connection when data cannot be transmitted after proceeding through the retry sequence and/or on request from the vehicle telematics device.

In addition to transmitting data in real time, vehicle telematics devices often upload and download files from remote server systems. In a variety of embodiments, the vehicle telematics device provides download protocol data to the mobile communications device that defines one or more download protocols to utilize to provide and/or obtain file data from a remote server system. Any file protocol, such as the File Transfer Protocol (FTP) or Hypertext Transfer Protocol GET method, as appropriate to the requirements of specific applications of embodiments of the invention. The vehicle telematics device can also provide the address (such as IP address and/or port) of the remote server system and any other metadata utilized to transmit and/or receive the data, such as file parameter data. For obtaining data from a remote server system, the mobile communication device can proceed to download the data from the remote server system and store the data locally. In several embodiments, the mobile communications device provides a notification message informing the vehicle telematics device that a file has been downloaded. On request from the vehicle telematics device, the file can be transferred from the mobile communications device to the vehicle telematics device. In a number of embodiments, the mobile communications device will store the data until a request to transfer the data is received and/or will delete the data once a File Service Request message is received. For transmitting data to a remote server system, the vehicle telematics device can provide the data to the mobile communications device that then stores the data locally. The data can then be transmitted from the mobile communications device to the remote server system when a connection is available and/or when a scheduled data transfer time is reached.

In many embodiments, a vehicle telematics device can send and receive short message service (SMS) messages. Radio access interface processes in accordance with embodiments of the invention can include sending and receiving SMS messages using a mobile communications device. In a number of embodiments, the SMS messages for the vehicle telematics device are tagged with metadata identifying that the vehicle telematics device is to receive the SMS messages and differentiate those messages from SMS messages addressed to the mobile communications device. SMS messages addressed to and/or originating from the vehicle telematics device can be stored on the mobile communications device until they can be delivered to the vehicle telematics device and/or sent via a cellular network. In several embodiments, the mobile communications device stores the SMS message data until a confirmation is received from the vehicle telematics device.

Radio access interface processes in accordance with embodiments of the invention can also include providing serial data services in order to transfer data between a vehicle telematics device and a mobile communications device. In several embodiments, the serial data services allow terminal applications executed on the mobile communications device to access data streams provided by the vehicle telematics device. These data streams can include, but are not limited to, GPS National Marine Electronics Association (NMEA) data streams, debug data streams, Hayes command data streams, and any other data stream as appropriate to the requirements of specific applications of embodiments of the invention. Hayes command data streams can include, but are not limited to, AT commands and commands to control the functioning of a modem such as those defined in "Digital Cellular Telecommunications System (Phase 2+); AT Command Set for GSM Mobile Equipment (ME)" as published by the European Telecommunications Standards Institute (ETSI), headquartered in Sophia Antipolis, France, the disclosure of which is hereby incorporated by reference in its entirety.

Figure 3:
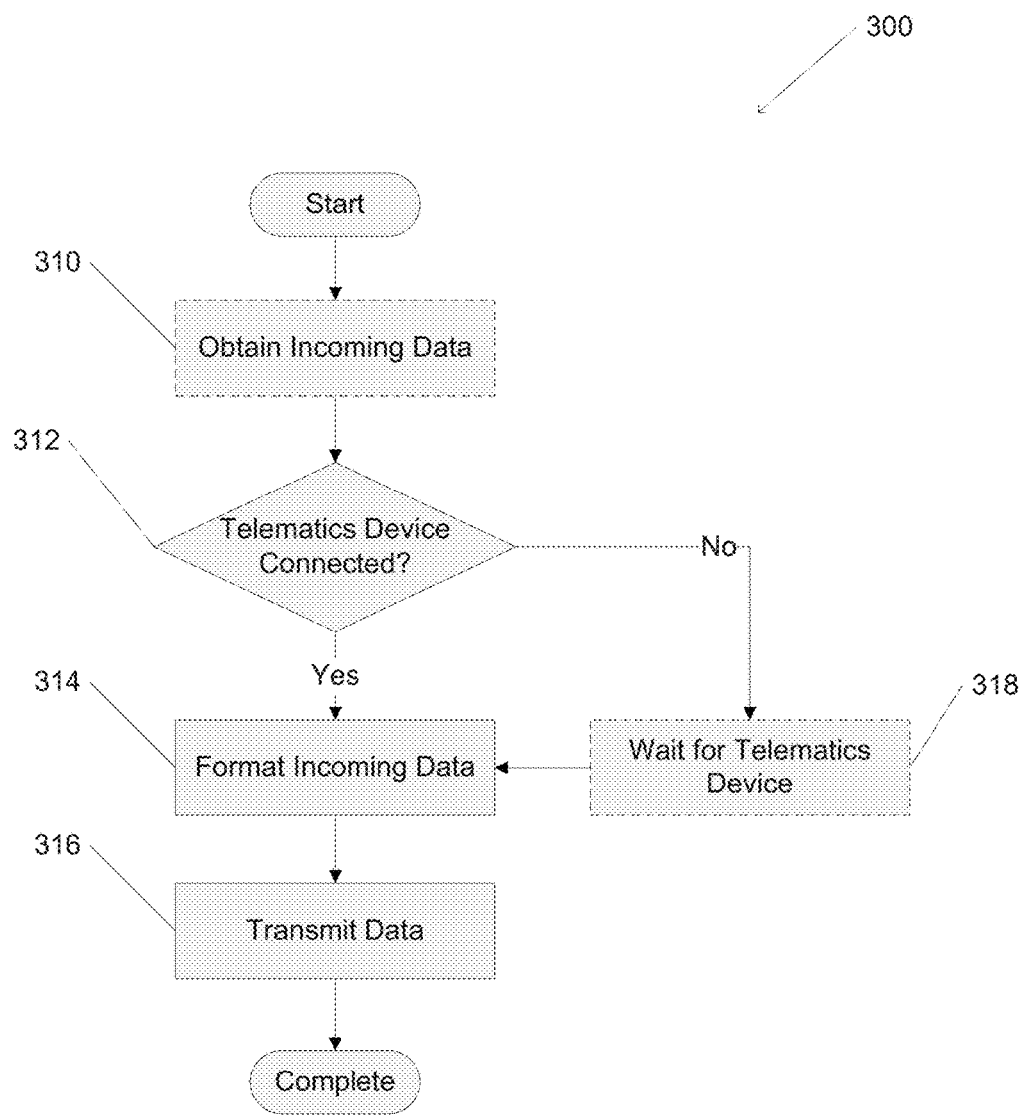
FIG. 3 is a flow chart illustrating a process for receiving data in accordance with an embodiment of the invention.

Turning now to FIG. 3, a process for receiving data using radio access interfaces in accordance with an embodiment is shown. The process 300 can include obtaining (310) incoming data. If a vehicle telematics device is connected (312), incoming data is formatted (314) and data is transmitted (316). In many embodiments, if a vehicle telematics device is not connected (312), the process 300 waits (318) for the vehicle telematics device to be connected and resumes once a vehicle telematics device is connected.

Figure 4:
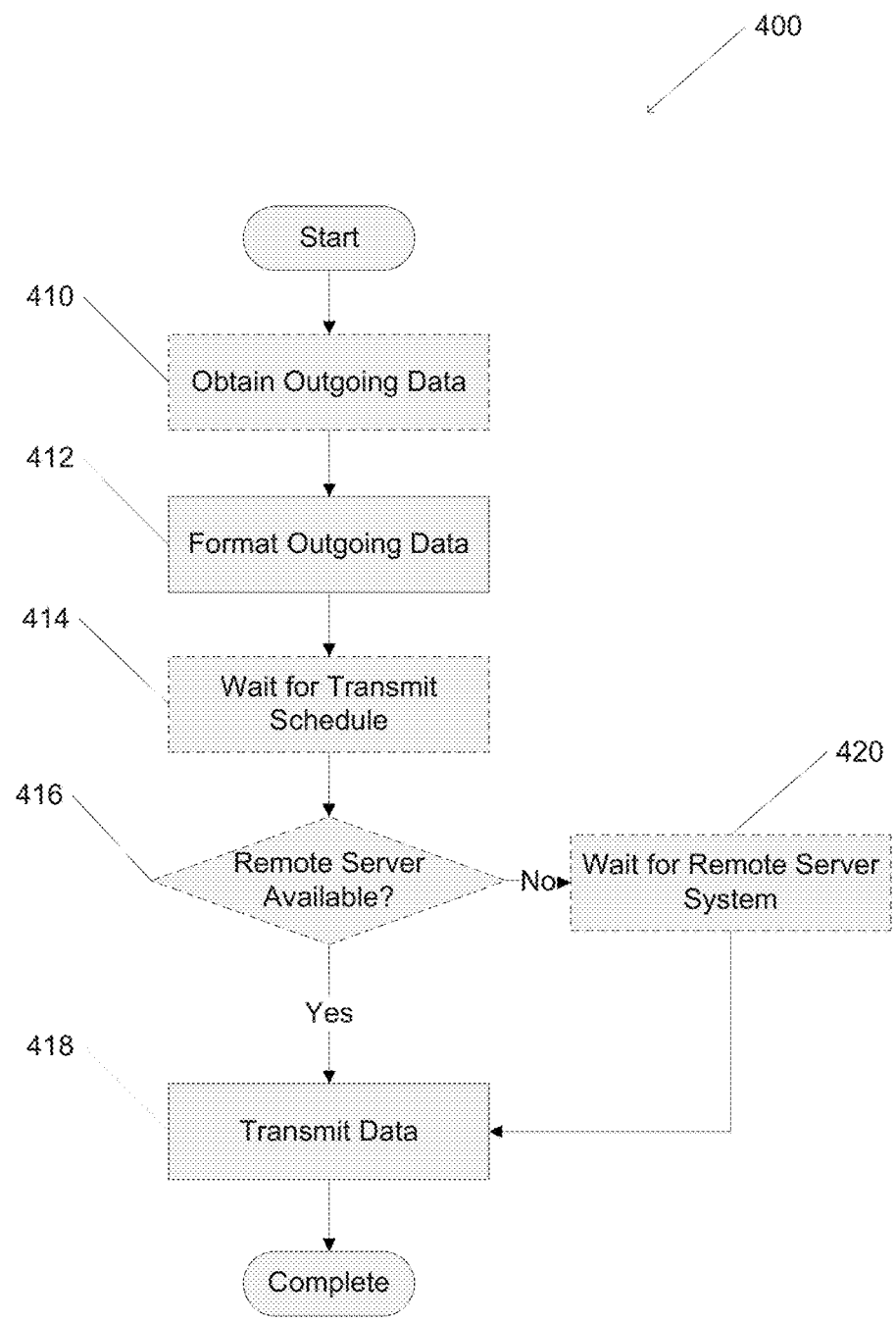
FIG. 4 is a flow chart illustrating a process for transmitting data in accordance with an embodiment of the invention.

Turning now to FIG. 4, a process for transmitting data using radio access interfaces in accordance with an embodiment of the invention is shown. The process 400 can include obtaining (410) outgoing data. Outgoing data is formatted (412) and, in several embodiments, the process 400 waits (414) for a scheduled transmission time (or location) and/or determines if a remote server is available (416). If the remote server system is not checked or is present (416), data is transmitted (418). If the remote server system is checked (416) and not available, the process 400 waits (420) for the remote server system to be available and then transmits data (418). In several embodiments, the transmitted data is further transformed before being re-transmitted to a remote server system.

Specific processes for transmitting and receiving data in accordance with embodiments of the invention are described herein and shown with respect to FIG. 3 and FIG. 4; however, any number of processes, including those that use alternative techniques for asynchronous and/or parallel transmission of data, can be utilized as appropriate to the requirements of a specific application in accordance with embodiments of the invention.

Command Data

As described herein, radio access interfaces processes can include using a variety of command data to control the transmission of data between a vehicle telematics device and a mobile communications device and/or between the mobile communications device and remote server systems. In several embodiments, the command data is implemented using the High-Level Data Link Control protocol, although any protocol can be utilized as appropriate to the requirements of specific applications of embodiments of the invention. This protocol provides the packet framing, addressing, and packet integrity checking required for the command data utilized in the radio access interface processes. In a variety of embodiments, packets of command data have the following structure:

| Start Flag | Control | Length | Information | FCS | End Flag |
| --- | --- | --- | --- | --- | --- | where each packet frame begins with the start flag byte and ends with the end flag byte. The flag sequence can be used for the synchronization of frames. In many embodiments, the start flag byte is 0xF9 and the end flag byte is 0xFA, although any value can be utilized as appropriate to the requirements of specific applications of embodiments of the invention.

In several embodiments, the Control byte contains a 3-bit Address field, the 4 bit Message Type field and a Command/Response (CR) bit as shown here:

| CR | Address (3) | Msg Type (4) |
| --- | --- | --- | where the Message Type field indicates the contents of the Information field, the Address field is used to designate the intended Service for the packet, and the CR bit is set when the packet is issued as a request and cleared when the packet is returned as a response.

In a number of embodiments, the following values are utilized for the Message Type field: 0 is a General Message, 1 is an Echo Request/Response, 2 is an Acknowledgement, 3 is a Service Request, 4 is a Data Notify, 5 is a Data Request, and 6 is Data. Further details for each of these messages types are disclosed herein. In many embodiments, the following values are used for the Address field: 0 is the Management Service, 1 is the UDP Service, 2 is the TCP Service, 3 is the File Transfer Service, 4 is the SMS Service, and 5 and 6 are Serial Stream Services. However, it should be noted that any values can be utilized for the message type and/or address as appropriate to the requirements of specific applications of embodiments of the invention.

In many embodiments, the Length byte specifies the length of the information field (in bytes). The Information field holds the payload of the message. The length of the Information field can be fixed or variable as appropriate to the requirements of specific applications of embodiments of the invention. In a variety of embodiments, the length of the Information field is limited to 255 bytes. The Frame Check Sequence (FCS) field can be utilized to provide error detection and/or correction. In several embodiments, the FCS field is calculated using a combination of the Control, Length, and/or Information fields. Any error detection and/or correction processes, including a cyclic redundancy check (CRC), forward error correction (FEC), and Hamming codes, can be utilized as appropriate to the requirements of specific applications of embodiments of the invention.

Message Types and the Information Field

As described herein, the Message Type field in the Control byte can be utilized to identify the type of data being transmitted via the radio access interface. The Information field can contain multiple bytes of data and any ordering, including big endian and little endian, can be utilized to order the Information field as appropriate to the requirements of specific applications of embodiments of the invention.

General Messages are general for all services and can be indicated by zero address in the Address field. One such General Message is a Service Status Request message that can be used to query the mobile communications device for current service status for some or all of the services offered by the mobile communications device. In several embodiments, a Service Status Request message is indicated by a zero value in the Message Type field. Service Status Request messages are originated by the vehicle telematics device and the Information field is empty. A second General Message is a Service Status Response message. In a number of embodiments, a Service Status Response message is indicated by a zero value in the Message Type field. The Service Status Response message is originated by the mobile communications device. In a variety of embodiments, a Service Status Response has an Information field with the following structure:

| Byte Position | Bit Encodings | Description | Size |
|---|---|---|---|
| 0 | Network Status: bits 0, 1 | Network Status:<br>0 = Disconnected<br>1 = Connected | 1 byte |
| | Serial Stream 1: bits 2, 3<br>Serial Stream 2: bits 4, 5 | Service Status:<br>0 = Inactive<br>1 = Initializing<br>2 = Active<br>3 = Failed | |
| 1 | UDP Service: bits 0, 1<br>TCP Service: bits 2, 3<br>File Transfer Service: bits 4, 5<br>SMS Service: bits 6, 7 | Service Status:<br>0 = Inactive<br>1 = Initializing<br>2 = Active<br>3 = Failed | 1 byte |
| 2, 3 | | Received Signal Strength Indication (RSSI) | 2 bytes |
| 4 | | System ID | 1 byte |
| 5-8 | | DNS Server Address | 4 bytes |

A third type of General Message is an Echo Request. An Echo Request can be utilized to check the connectivity between the mobile communications device and the vehicle telematics device. In many embodiments, an Echo Request message is indicated by a value of 1 in the Message Type field. Both devices can originate the Echo Request and the Information field is empty. A fourth type of General Message is an Echo Response. In a variety of embodiments, an Echo Response message is indicated by a value of 1 in the Message Type field. The Echo Response is generated in response to a received Echo Request and can be originated from both the mobile communications device and the vehicle telematics device. In several embodiments, an Echo Request and/or an Echo Response has an empty Information field.

Although specific examples of General Messages are described herein, it should be appreciated that other messages can be utilized as General Messages in accordance with embodiments of the invention. Additionally, messages with structures other than those described herein, including Service Status Response messages with alternative structures and Echo messages having identification data, can be utilized as appropriate to the requirements of specific applications of embodiments of the invention.

Those messages that are not General Messages can be referred to as Service Specific Messages. These messages are specific to one of the services described herein and can be indicated by a non-zero address in the Address field and/or a value of 2 in the Message Type field of the Control byte. In a variety of embodiments, the actual length of variable length values described herein can be calculated based on the Length field and the size of elements with known lengths.

A first type of Service Specific Message is an Acknowledgement (i.e. Ack) message; these messages can be sent by the vehicle telematics device or the mobile communications device. Acknowledgement messages can be used for UDP, TCP, File Transfer, SMS, and Serial Stream services provided via radio access interface processes to acknowledge receipt of particular messages, such as (but not limited to) service request and data notifications. In several embodiments, the Information field is empty for Ack messages sent in response to Service Requests, File Data messages, and Serial Stream Data Notify messages. In a variety of embodiments, the Information field for an Ack message to a UDP Data Notify or a UDP Data Message contains the next expected datagram byte offset value. In many embodiments, the Information field for an Ack message to a TCP Data Notify Message contains the next expected byte sequence number. In a number of embodiments, the Information field for an Ack message to a SMS Data Notify contains the message serial number from the Data Notify Message. Ack messages can have the following structures as appropriate to the requirements of specific applications of embodiments of the invention:

UDP Data Notify Ack Message and Data Ack Message Information Field:

| Byte Position | Description | Size |
|---|---|---|
| 0, 1 | UDP Datagram Offset | 2 bytes |

TCP Data Notify Ack Message Information Field:

| Byte Position | Description | Size |
|---|---|---|
| 0, 1 | Byte Sequence Number | 2 bytes |

SMS Data Notify Ack Message Information Field:

| Byte Position | Description | Size |
|---|---|---|
| 0, 1 | Message Serial Number | 1 byte |

A second type of Service Specific Message is a Service Request message. In several embodiments, a Service Request message is indicated by a value of 3 in the Message Type field. Service Request messages can be sent by a vehicle telematics device to control the services (i.e. data protocols) that are provided by the mobile communications device via the radio access interface. Service Request messages can have the following structures as appropriate to the requirements of specific applications of embodiments of the invention:

UDP Service Request Message Information Field:

| Byte Position | Description | Size |
|---|---|---|
| 0 | Action: 0 = Stop, 1 = Start | 1 byte |
| 1, 2 | Local Port | 2 bytes |

TCP Service Request Message Information Field:

| Byte Position | Description | Size |
|---|---|---|
| 0 | Action: 0 = Stop, 1 = Start | 1 byte |
| 1 . . . 4 | Remote Address | 4 bytes |
| 5, 6 | Remote Port | 2 bytes |

File Transfer Service Request Message Information Field:

| Byte Position | Description | Size |
|---|---|---|
| 0 | | 1 byte |
| bits 0 . . . 3 | Action: 0 = Stop, 1 = Start | |
| bits 4 . . . 7 | Protocol: 0 = HTTP, (1-15) = Reserved | |
| 1-4 | Remote Address | 4 bytes |
| 5, 6 | Remote Port | 2 bytes |
| 7-n | HTTP Parameter string used with the GET method. | Variable |

SMS and Serial Stream Service Request Message Information Field:

| Byte Position | Description | Size |
|---|---|---|
| 0 | Action: 0 = Stop, 1 = Start | 1 byte |

A third type of Service Specific Message is a Data Notify message. In several embodiments, a Data Notify message is indicated by a value of 4 in the Message Type field. Data Notify messages can be sent by the vehicle telematics device or the mobile communications device to indicate to the other device that there is data available. Data Notify messages can have the following structures as appropriate to the requirements of specific applications of embodiments of the invention:

UDP Data Notify Message Information Field:

| Byte Position | Description | Size |
|---|---|---|
| 0, 1 | UDP Message Length | 2 bytes |
| 2 . . . 5 | Remote Address | 4 bytes |
| 6, 7 | Remote Port | 2 bytes |
| 8-n | UDP Message Data | Variable |

TCP Data Notify Message Information Field:

| Byte Position | Description | Size |
|---|---|---|
| 0, 1 | Byte Sequence Number | 2 bytes |
| 2 . . . n | TCP Stream Data | Variable |

File Transfer Data Notify Message Information Field:

| Byte Position | Description | Size |
|---|---|---|
| 0-3 | File Length | 4 bytes |

SMS Data Notify Message Information Field:

| Byte Position | Description | Size |
|---|---|---|
| 0 | Message Serial Number | 1 byte |
| 1-n | Phone Number String | Variable |
| n-m | Text Message String | Variable |

Serial Stream Data Notify Message Information Field:

| Byte Position | Description | Size |
|---|---|---|
| 0-n | Serial Stream Data | Variable |

A fourth type of Service Specific Message is a Data Request message. In several embodiments, a Data Request message is indicated by a value of 5 in the Message Type field. Data Request messages can be sent by a vehicle telematics device to request data from the mobile communications device in conjunction with the File Transfer service. In many embodiments, a Data Request message is not utilized in conjunction with the UDP, TCP, SMS or Serial Stream services. Data Request messages can have the following structures as appropriate to the requirements of specific applications of embodiments of the invention:

File Transfer Data Request Information Field:

| Byte Position | Description | Size |
|---|---|---|
| 0-3 | File Data Offset | 4 bytes |
| 4 | Max Data Bytes to Send | 1 byte |

A fifth type of Service Specific Message is a Data message. In several embodiments, a Data message is indicated by a value of 6 in the Message Type field. Data messages can be sent by the vehicle telematics device or the mobile communications device to transfer data requiring multiple packets via the UDP service. Data messages can also be utilized by the mobile communications device to transfer data via the File Transfer service. In a number of embodiments, a Data message is not utilized in conjunction with the TCP, SMS, or Serial Stream services. Data messages can have the following structures as appropriate to the requirements of specific applications of embodiments of the invention:

UDP Data Message Information Field:

| Byte Position | Description | Size |
|---|---|---|
| 0, 1 | UDP Datagram Offset | 2 bytes |
| 2-n | UDP Datagram Data | Variable |

File Transfer Data Message Information Field:

| Byte Position | Description | Size |
|---|---|---|
| 0-3 | File Data Offset | 4 bytes |
| 4-n | File Data | Variable |

Although specific examples of Service Specific Messages are described herein, it should be appreciated that other messages can be utilized as Service Specific Messages in accordance with embodiments of the invention. Additionally, messages with structures other than those described herein, including those messages that contain additional data fields and/or store specific fields in different byte positions, can be utilized as appropriate to the requirements of specific applications of embodiments of the invention. Furthermore, any values, particularly those variable length values within the Information field, can be terminated using any character, including null-terminated values, as appropriate to the requirements of specific applications of embodiments of the invention.

Communication Data Flow

Radio access interfaces in accordance with embodiments of the invention include passing a variety of control messages and/or data between a vehicle telematics device and a mobile communications device. FIGS. 5A-E are sequence diagrams conceptually illustrating the flow of data between these devices in accordance with embodiments of the invention.

Radio access interface processes include providing a UDP service. In several embodiments, the vehicle telematics device sends a UDP Service Request as soon as communication is established with the mobile communications device. In a number of embodiments, the byte offset field for each UDP datagram starts at zero and is updated to match the datagram length specified in the last received Ack message. In many embodiments, the vehicle telematics device manages a UDP transmit buffer as a datagram queue. The use of a datagram queue is advantageous as it avoids datagram collisions and allows the use of Ack messages to control the flow of data between the vehicle telematics device and the mobile communications device. However, any data structure can be utilized to manage the datagram queue as appropriate to the requirements of specific applications of embodiments of the invention. In a variety of embodiments, if a timeout or other error condition is detected during a transfer of a UDP datagram using the radio access interface then the UDP datagram is discarded.

Figure 5A:
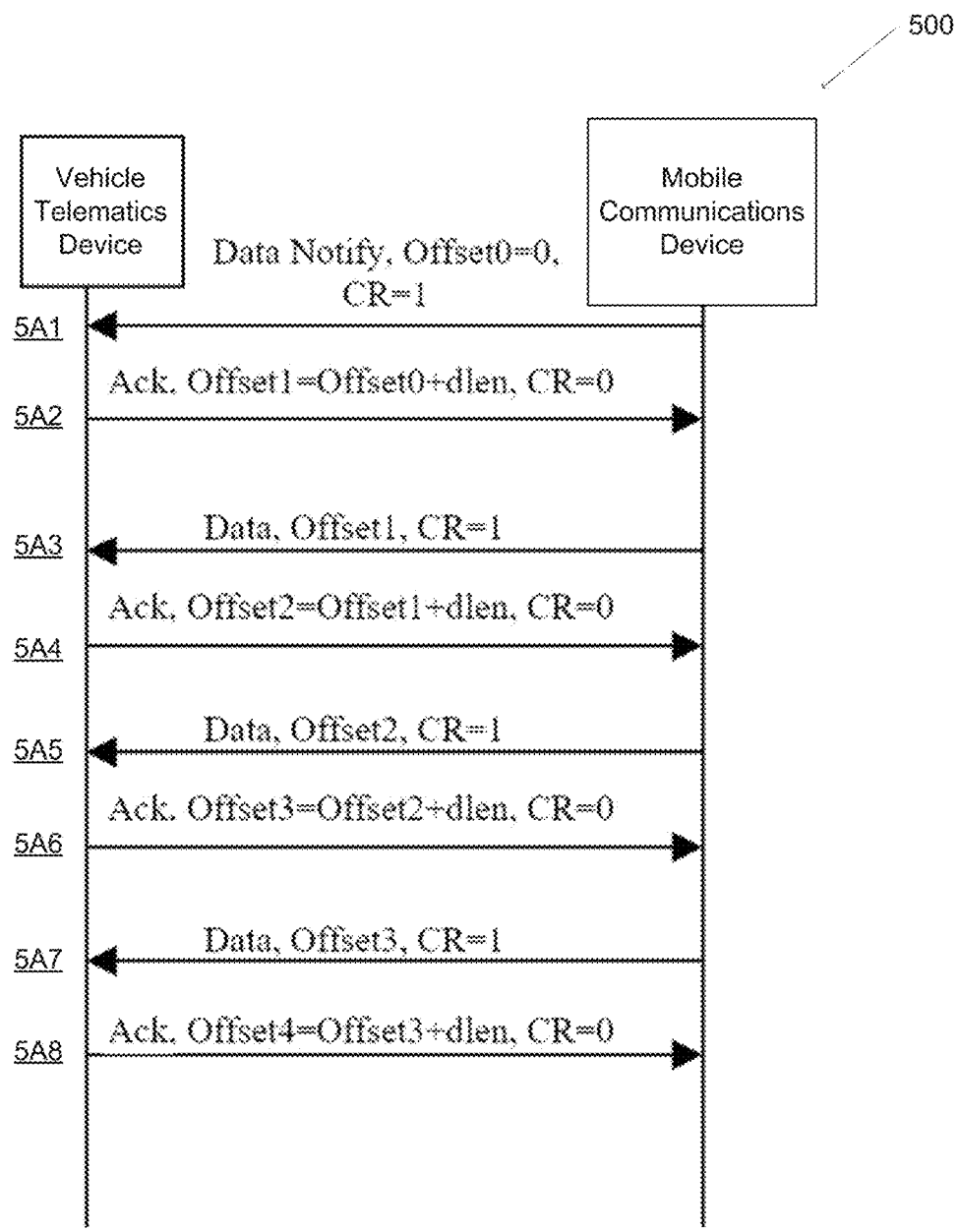
FIGS. 5A-E are sequence diagrams illustrating the communication of data in accordance with embodiments of the invention.

Turning now to FIG. 5A, a sequence diagram showing the transfer of data via a bi-directional UDP service in accordance with an embodiment of the invention is shown. The sequence 500 includes steps 5A1-5A8. At step 5A1, a Data Notify message is set from a mobile communications device to a vehicle telematics device with its CR bit set to 1 and an offset of zero. At step 5A2, an Ack message is sent from the vehicle telematics device to the mobile communications device with its CR bit set to 0 and its offset calculated as the length of the Data Notify message sent at step 5A1. At step 5A3, a Data message is sent from the mobile communications device with an offset matching the calculated offset from step 5A2 and its CR bit set to 1. At step 5A4, an Ack message is sent from the vehicle telematics device to the mobile communications device with its CR bit set to 0 and its offset calculated as the length of the previous offset plus the length of the Data message at step 5A3. At step 5A5, a Data message is sent from the mobile communications device with an offset matching the calculated offset from step 5A4 and its CR bit set to 1. At step 5A6, an Ack message is sent from the vehicle telematics device with its CR bit set to 0 and its offset calculated as the length of the previous offset plus the length of the Data message at step 5A5. At step 5A7, a Data message is sent from the mobile communications device with an offset matching the calculated offset from step 5A6 and its CR bit set to 1. At step 5A8, an Ack message is sent from the vehicle telematics device with its CR bit set to 0 and its offset calculated as the length of the previous offset plus the length of the Data message at step 5A7. With the data transferred, the sequence completes.

Radio access interface processes also include providing a TCP service. In many embodiments, when the vehicle telematics device attempts to invoke the TCP service, a TCP Service Request to the mobile communications device. In a variety of embodiments, the first TCP data byte transferred will have a byte sequence number of zero. TCP transmissions are guaranteed with multiple retries. In several embodiments, if the mobile communications device's retry sequence fails or an error condition occurs the mobile communications device can provide a Service Status message indicating the error condition. In a number of embodiments, if the vehicle telematics device detects an error condition or its retry sequence fails then the vehicle telematics device will close the TCP service and/or provide command data to the mobile communications device to close its TCP service.

Figure 5B:
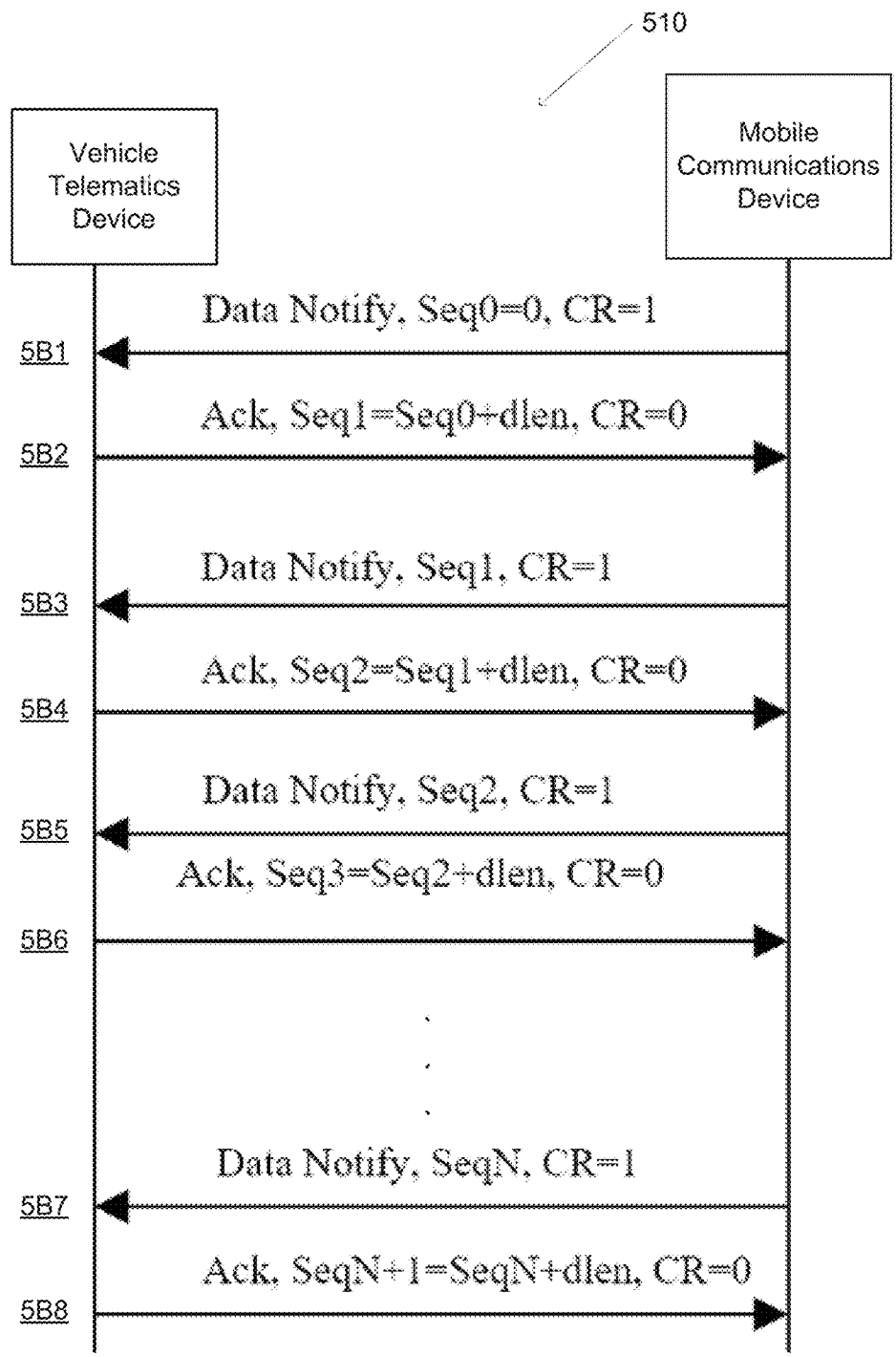

Turning now to FIG. 5B, a sequence diagram conceptually illustrating a bi-directional TCP service is shown. The sequence 510 includes steps 5B1-5B8. At step 5B1, a Data Notify message is set from a mobile communications device to a vehicle telematics device with its CR bit set to 1 and a sequence number of zero. At step 5B2, an Ack message is sent from the vehicle telematics device to the mobile communications device with its CR bit set to 0 and its sequence calculated as the length of the Data Notify message sent at step 5B1. At step 5B3, a Data Notify message is sent from the mobile communications device with a sequence matching the sequence from step 5B2 and its CR bit set to 1. At step 5B4, an Ack message is sent from the vehicle telematics device to the mobile communications device with its CR bit set to 0 and its sequence calculated as the previous sequence plus the length of the Data Notify message at step 5B3. At step 5B5, a Data Notify message is sent from the mobile communications device with a sequence matching the sequence from step 5B4 and its CR bit set to 1. At step 5B6, an Ack message is sent from the vehicle telematics device with its CR bit set to 0 and its sequence calculated as the previous sequence plus the length of the Data Notify message at step 5B5. This process repeats until at step 5B7, a Data Notify message is sent from the mobile communications device with the last of the data to be transmitted via the TCP service and its CR bit set to 1. At step 5B8, an Ack message is sent from the vehicle telematics device with its CR bit set to 0 and its sequence calculated as the previous sequence plus the length of the Data Notify message from step 5B7. With the data transferred, the sequence completes.

Radio access interfaces further include providing a File Transfer service. In several embodiments, when the vehicle telematics device initiates the File Transfer service, it can use the Hypertext Transfer Protocol (HTTP) to effect the transfer. Radio access interface processes can include converting the HTTP request to a File Service Request to be sent to the mobile communications device and a HTTP response to the vehicle telematics device. Once the mobile communications device obtains the requested data, a File Notify message can be sent to the vehicle telematics device. The vehicle telematics device can then send one or more Data Request messages to the mobile communications device until the requested data is transferred using the File Transfer service. Once the File Transfer service is complete, the transferred data can be converted to the appropriate HTTP response in order to fulfill the original HTTP request. In this way, radio access interfaces can be utilized to execute data transfers via HTTP.

Figure 5C:
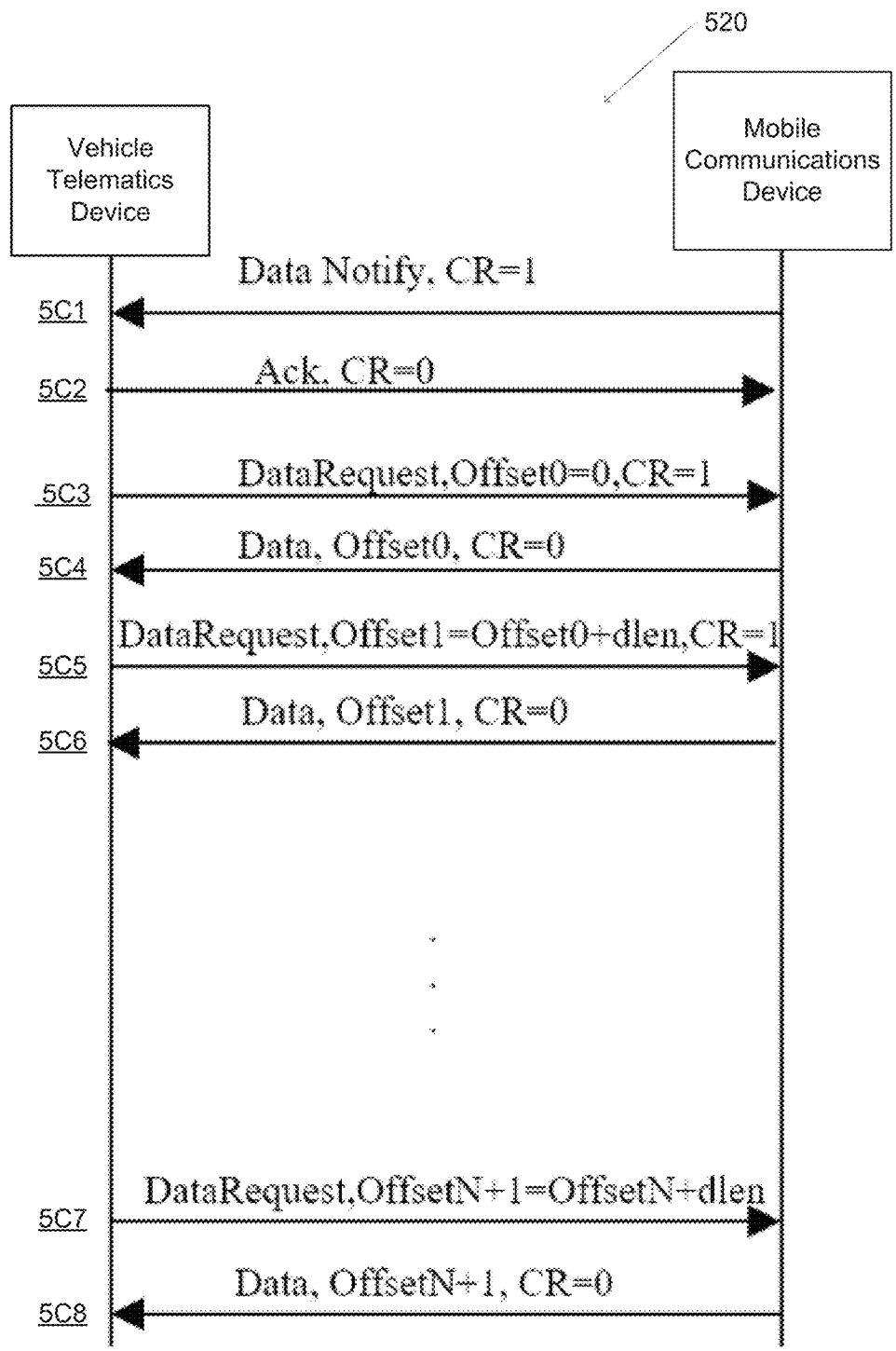

Turning now to FIG. 5C, a sequence diagram conceptually illustrating the File Transfer service is shown. The sequence 520 includes steps 5C1-5C8. At step 5C1, a Data Notify message is set from a mobile communications device to a vehicle telematics device with its CR bit set to 1. At step 5C2, an Ack message is sent from the vehicle telematics device to the mobile communications device with its CR bit set to 0. At step 5C3, a Data Request message is sent from the vehicle telematics device with an offset of 0 and its CR bit set to 1. At step 5C4, a Data message is sent from the mobile communications device with its CR bit set to 0 and an offset of 0. At step 5C5, a Data Request message is sent from the vehicle telematics device with an offset of the previous offset plus the size of the data received in step 5C4 and its CR bit set to 1. At step 5C6, a Data message is sent from the mobile communications device with its CR bit set to 0 and the offset calculate in step 5C5. This process repeats until at step 5C7, a Data Request message is sent from the vehicle telematics device with an offset calculated as the total sum of the data received in the preceding Data messages and a CR bit set to 1. At step 5C8, a Data message is sent from the mobile communications device with its CR bit set to 0 and offset set at the value calculated in step 5C7. With the data transferred, the sequence completes.

A SMS service is also provided via radio access interface processes. In many embodiments, a vehicle telematics device sends a SMS Service Request message when communication is established with a mobile communications device. The mobile communications device can store SMS data until a request is made by the vehicle telematics device. In a number of embodiments, SMS data includes a serial number. In several embodiments, the message serial number received by the vehicle telematics device in the SMS Notify message will sent back in the Ack to confirm delivery of a particular SMS message.

Figure 5D:
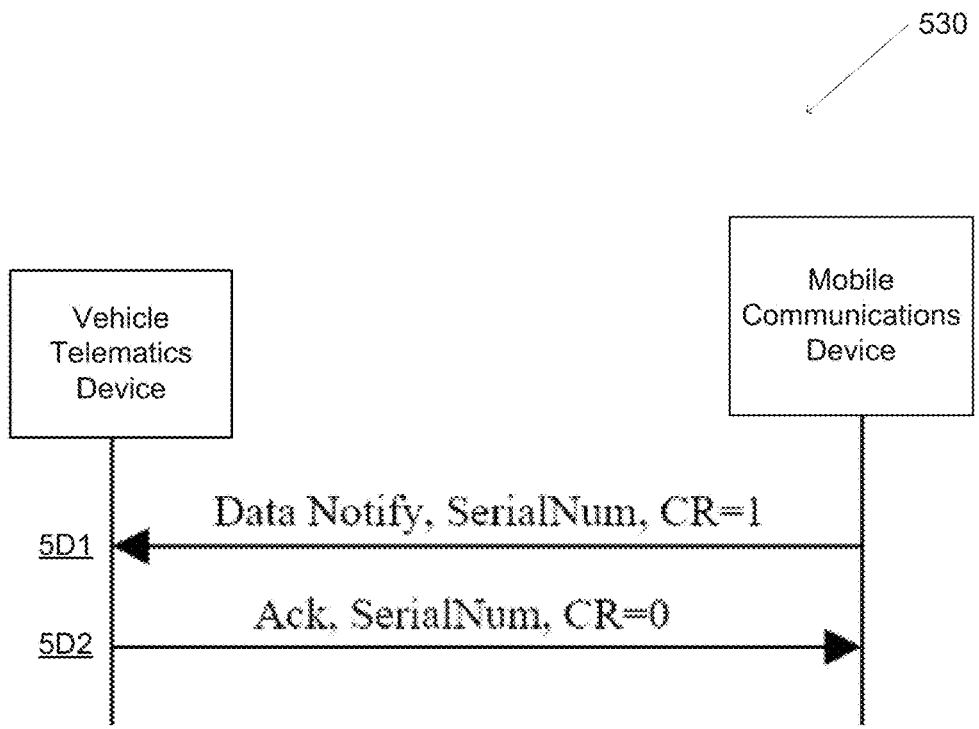

Turning to FIG. 5D, a sequence diagram conceptually illustrating the transfer of SMS data via radio access interfaces processes is shown. The sequence 530 includes steps 5D1 and 5D2. At step 5D1, a Data Notify message is sent from the mobile communications device to the vehicle telematics device with the SMS data, the serial number of the SMS message, and its CR bit set to 1. At step 5D2, an Ack message is sent from the vehicle telematics device to the mobile communications device; the Ack message includes the serial number from step 5D1 and its CR bit is set to 0. With the SMS data transferred, the sequence completes.

Radio access interface processes also include providing Serial Stream services. In many embodiments, a Serial Stream service provided via radio access interface processes is mapped to a physical serial interface in the vehicle telematics device. In this way, the Serial Stream service can be utilized to transmit data directly from the serial interface. In a number of embodiments, one or more Serial Stream services are established when the vehicle telematics device establishes communications with the mobile communications device. In a variety of embodiments, the sequence 530 described herein can be utilized for Serial Stream services. In many embodiments, the serial number field is not utilized for the transfer of data in Serial Stream services. However, it should be noted that identification data can be utilized in Serial Stream services as appropriate to the requirements of specific applications of embodiments of the invention.

Figure 5E:
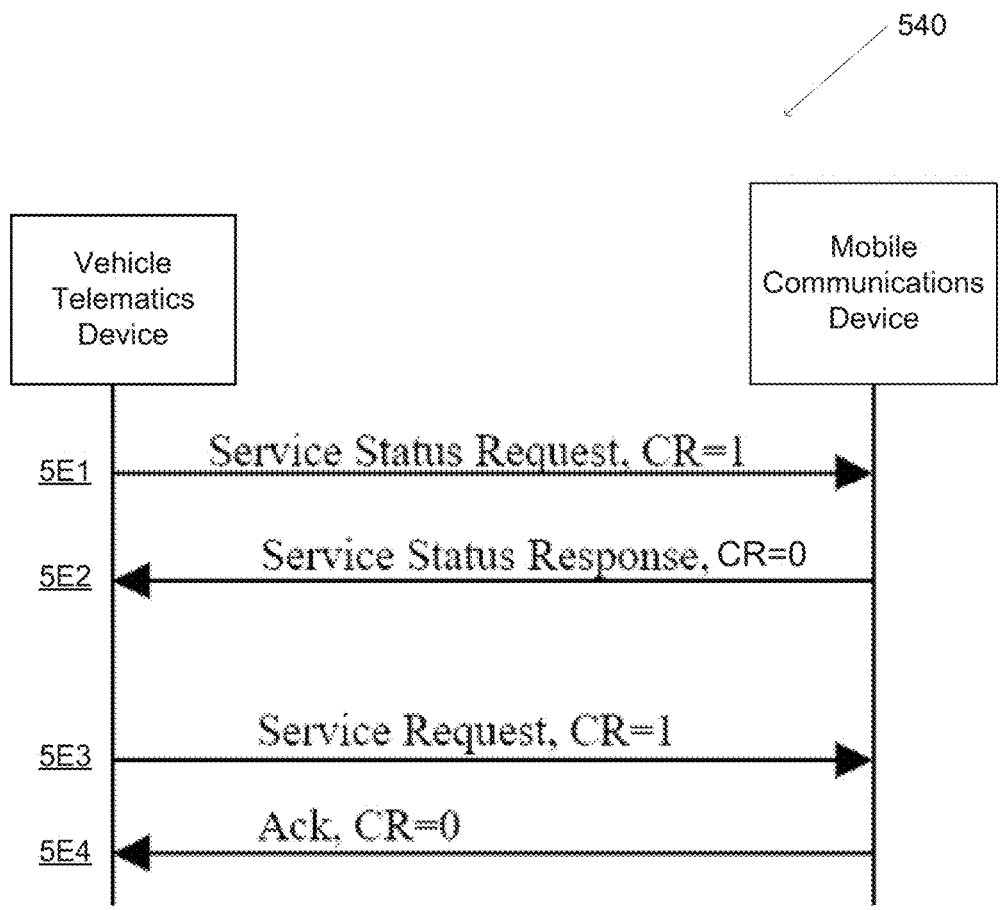

Turning now to FIG. 5E, a sequence diagram conceptually illustrating the setup of a service provided by a radio access interface is shown. The sequence 540 includes steps 5E1-5E4. At step 5E1, a Service Status Request message is sent from the vehicle telematics device to the mobile communications device with its CR bit set to 1. At step 5E2, a Service Status Response message is sent from the mobile communications device to the vehicle telematics device with its CR bit set to 0. At step 5E3, a Service Request message is sent from the vehicle telematics device with a CR bit set to 1. At step 5E4, an Ack message is sent from the mobile communications device with a CR bit set to 0. With the data transferred, the sequence completes.

Specific processes for communicating data for a variety of services provided by radio access interfaces are described with respect to FIGS. 5A-E. However, these illustrations are examples. It should be appreciated that any number of processes, including those that use alternative techniques for asynchronous and/or parallel transmission of data and those that originate communications from the receiving device described herein, can be utilized as appropriate to the requirements of a specific application in accordance with embodiments of the invention.

Although the embodiments have been described in certain specific aspects, many additional modifications and variations would be apparent to those skilled in the art. In particular, any of the various processes described herein can be performed in alternative sequences and/or in parallel (on the same or on different computing devices) in order to achieve similar results in a manner that is more appropriate to the requirements of a specific application. It is therefore to be understood that the embodiments can be practiced otherwise than specifically described without departing from the scope and spirit of the embodiments. Thus, the embodiments should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A vehicle telematics device, comprising:
a processor; and
a communications interface coupled to the processor;
a memory coupled to the processor;
wherein, in response to one or more instructions stored in the memory, the vehicle telematics device:
communicates with a mobile communications device by using the communications interface;
provides data to the mobile communications device to generate provided data, where the provided data is to be transmitted to the remote server system; and
provides command data to the mobile communications device, wherein the command data instructs the mobile communication device to:
process the provided data to generate formatted data based on the command data;
wait for the remote server system to be available to the mobile communications device; and
transmit the formatted data to the remote server system by using at least one communication protocol based on the command data.

2. The vehicle telematics device of claim 1, wherein the mobile communications device comprises a smart phone.

3. The vehicle telematics device of claim 2, wherein:
the smart phone comprises an application executing within an operating system installed on the smart phone;
the application provides access to a file system provided by the operating system; and
the application provides access to cellular data services via the operating system.

4. The vehicle telematics device of claim 1, wherein the mobile communications device is integrated into a vehicle.

5. The vehicle telematics device of claim 4, wherein:
the mobile communications device is accessible via a vehicle data bus installed in the vehicle;
the vehicle telematics device is coupled to a diagnostic port within the vehicle, wherein the diagnostic port provides access to the vehicle data bus; and
the vehicle telematics device communicates with the mobile communications device by using the vehicle data bus.

6. The vehicle telematics device of claim 1, wherein the communications interface comprises a Bluetooth radio.

7. The vehicle telematics device of claim 1, wherein the communications interface comprises a wired connection.

8. The vehicle telematics device of claim 1, wherein the communications interface comprises a wireless network access device.

9. The vehicle telematics device of claim 1, wherein the command data further comprises metadata describing when the mobile communications device is to transmit the data to the remote server system.

10. A method for transmitting data by using a radio access interface, the method comprising:
 providing data from a vehicle telematics device to a mobile communications device to generate provided data, wherein the vehicle telematics device includes a processor, a memory coupled to the processor, and a communications interface coupled to the processor, wherein the vehicle telematics device communicates with the mobile communications device via the communications interface; and
 providing command data from the vehicle telematics device to the mobile communications device, wherein the command data instructs the mobile communication device to:
  process the provided data to generate formatted data based on the command data;
  wait for the remote server system to be available to the mobile communications device; and
  transmit the formatted data to the remote server system by using at least one communication protocol based on the command data.

11. The method of claim 10, wherein the mobile communications device comprises a smart phone.

12. The method of claim 11, wherein:
 the smart phone comprises an application executing within an operating system installed on the smart phone;
 the application provides access to a file system provided by the operating system; and
 the application provides access to cellular data services via the operating system.

13. The method of claim 10, wherein the mobile communications device is integrated into a vehicle.

14. The method of claim 13, wherein:
 the mobile communications device is accessible via a vehicle data bus installed in the vehicle;
 the vehicle telematics device is coupled to a diagnostic port within the vehicle, wherein the diagnostic port provides access to the vehicle data bus; and
 the vehicle telematics device communicates with the mobile communications device by using the vehicle data bus.

15. The method of claim 10, wherein the communications interface comprises a Bluetooth radio.

16. The method of claim 10, wherein the communications interface comprises a wired connection.

17. The method of claim 10, wherein the communications interface comprises a wireless network access device.

18. The method of claim 10, wherein the command data further comprises metadata describing when the mobile communications device is to transmit the data to the remote server system.

* * * * *